United States Patent
Iyer et al.

(10) Patent No.: US 10,936,055 B2
(45) Date of Patent: Mar. 2, 2021

(54) ENCODING CONTENT FOR VIRTUAL, AUGMENTED, AND MIXED REALITY (XR) APPLICATIONS IN CONNECTIVITY-CONSTRAINED ENVIRONMENTS

(71) Applicant: Dell Products, L.P., Round Rock, TX (US)

(72) Inventors: Vivek Viswanathan Iyer, Austin, TX (US); Michael S. Gatson, Austin, TX (US)

(73) Assignee: Dell Products, L.P., Round Rock, TX (US)

( * ) Notice: Subject to any disclaimer, the term of this patent is extended or adjusted under 35 U.S.C. 154(b) by 121 days.

(21) Appl. No.: 16/256,819

(22) Filed: Jan. 24, 2019

(65) Prior Publication Data
US 2020/0241634 A1   Jul. 30, 2020

(51) Int. Cl.
| | |
|---|---|
| G06T 7/194 | (2017.01) |
| G06F 3/01 | (2006.01) |
| H04N 19/17 | (2014.01) |
| G02B 27/01 | (2006.01) |
| G06T 19/00 | (2011.01) |

(52) U.S. Cl.
CPC ........... *G06F 3/013* (2013.01); *G02B 27/017* (2013.01); *G06T 7/194* (2017.01); *G06T 19/006* (2013.01); *H04N 19/17* (2014.11); *G06T 2207/20004* (2013.01)

(58) Field of Classification Search
None
See application file for complete search history.

(56) References Cited

U.S. PATENT DOCUMENTS

| | | | | |
|---|---|---|---|---|
| 10,482,677 | B1 * | 11/2019 | Iyer | G06K 9/3241 |
| 2011/0235706 | A1 * | 9/2011 | Demircin | H04N 19/126 |
| | | | | 375/240.03 |
| 2013/0058394 | A1 * | 3/2013 | Nilsson | H04N 19/61 |
| | | | | 375/240.02 |
| 2013/0229499 | A1 * | 9/2013 | Zhao | G06K 9/00355 |
| | | | | 348/51 |

(Continued)

OTHER PUBLICATIONS

Displaylink, "Wireless VR," 4 pages, retrieved Oct. 19, 2018, available at http://www.displaylink.com/vr.

(Continued)

*Primary Examiner* — Delomia L Gilliard
(74) *Attorney, Agent, or Firm* — Fogarty LLP

(57) ABSTRACT

Embodiments of systems and methods for encoding content for virtual, augmented, or mixed reality (xR) applications in connectivity-constrained environments are described. In some embodiments, an Information Handling System (IHS) may be configured to: receive sensor information from a Head-Mounted Device (HMD) worn by a user during execution of an xR application; calculate, based on the sensor information, a priority of each of a plurality of Regions-of-Interest (ROIs) within one or more images produced by a rendering engine; and indicate the priorities to a video encoder, where the video encoder is configured to use each priority to control at least one of: (a) visual fidelity, or (b) resilience of a corresponding ROI transmitted by the IHS to the HMD in a video signal during execution of the xR application.

19 Claims, 6 Drawing Sheets

(56) References Cited

U.S. PATENT DOCUMENTS

| | | | | |
|---|---|---|---|---|
| 2015/0237351 | A1* | 8/2015 | Lee | H04N 19/176 375/240.26 |
| 2016/0317122 | A1* | 11/2016 | dos Santos Mendonca | A61B 8/5269 |
| 2018/0164593 | A1* | 6/2018 | Van Der Auwera | H04N 21/816 |
| 2019/0212827 | A1* | 7/2019 | Kin | G02B 27/0179 |
| 2019/0213792 | A1* | 7/2019 | Jakubzak | G06F 3/017 |
| 2019/0361526 | A1* | 11/2019 | Young | G06F 3/011 |
| 2020/0074734 | A1* | 3/2020 | Hamlin | G06T 7/20 |
| 2020/0082555 | A1* | 3/2020 | Iyer | G06T 19/006 |
| 2020/0143238 | A1* | 5/2020 | Ramnath | G06K 9/00677 |

OTHER PUBLICATIONS

Steve Lynch, "AMD Acquires Nitero, Maker of 60GHz Wireless Chips for VR/AR Headsets," Virtual Reality News, published Apr. 10, 2017, 4 pages, retrieved Oct. 19, 2018, available at https://www.tomshardware.com/news/amd-acquires-nitero-wireless-vr,34106.html.

Tpcast, "Unleash the VR World," 2 pages, retrieved Oct. 19, 2018, available at https://www.tpcastvr.com/.

Christopher Bulla, et al., "Region of Interest Encoding in Video Conference Systems," The Fifth International Conferences on Advances in Multimedia, published 2013, 6 pages, publisher IARIA, retrieved Oct. 19, 2018, available at https://www.tpcastvr.com/.

Sebastiaan Van Leuven, et al., "An Implementation of Multiple Region-of-Interest Models in H.264/AVC," published 2006, pp. 502-511, publisher SITIS, retrieved Oct. 19, 2018, available at https://pdfs.semanticscholar.org/075f/870cf4d3255ceb6fd7c4915297853af1a823.pdf.

Hikvision, "ROI (Region of Interest) Encoding Technology V0.5," 7 pages, retrieved Oct. 19, 2018, available at http://oversea-download.hikvision.com/UploadFile/file/Hikvision_ROI_Encoding_Technology_V0.5_pdf.

Github—Chaotic Conundrum, "H.264 video Region of Interest encoding tool, using x264," 3 pages, retrieved Oct. 19, 2018, available at https://github.com/ChaoticConundrum/h264-roi.

P. Subramanian, et al., "Bit Rate Control Schemes for ROI Video Coding," International Journal of Computer Theory and Engineering, published Oct. 2011, pp. 628-631, vol. 3, No. 5, retrieved Oct. 19, 2018, available at https://pdfs.semanticscholar.org/4533/dd0239031e3f088ac5b4d24655415503860c.pdf.

Doom9's Fourm, "How to implement ROI(region of interest) encoding through ffmpeg/x264," 2 pages, retrieved Oct. 19, 2018, available at http://forum.doom9.org/archive/index.php/t-170528.html.

Yao Wang, et al. "Review of Error Resilient Coding Techniques for Real-Time Video Communications," 48 pages, retrieved Oct. 19, 2018, available at https://pdfs.semanticscholar.org/cccb/621431da97dd8f8371663b772401638598b6.pdf.

Mewiki, "X264 Settings," 30 pages, retrieved Oct. 19, 2018, available at http://www.chaneru.com/Roku/HLS/X264_Settings.htm.

Wikipedia, "Advanced Audio Coding," 16 pages, retrieved Oct. 19, 2018, available at https://en.wikipedia.org/wiki/Advanced_Audio_Coding.

Texas Instruments, "Application Parameter Settings for TMS320DM365 H.264 Encoder," Application Report, published Apr. 2010, 14 pages, retrieved Oct. 19, 2018, available at http://www.ti.com/lit/an/spraba9/spraba9.pdf.

Riisgaard, et al., "SLAM for Dummies", 127 pages, retrieved Oct. 19, 2018, available at https://ocw.mit.edu/courses/aeronautics-and-astronautics/16-412j-cognitive-robotics-spring-2005/projects/1aslam_blas_repo.pdf.

Occipital, "Structure Core Module," published 2018, 5 pages, retrieved Oct. 19, 2018, available at https://occipital.com/.

Robert Collins, "Lecture 12: Camera Projection," 34 pages, retrieved Oct. 19, 2018, available at http://www.cse.psu.edu/~rtc12/CSE486/lecture12.pdf.

* cited by examiner

ENCODING CONTENT FOR VIRTUAL, AUGMENTED, AND MIXED REALITY (XR) APPLICATIONS IN CONNECTIVITY-CONSTRAINED ENVIRONMENTS

FIELD

The present disclosure generally relates to Information Handling Systems (IHSs), and, more particularly, to systems and methods for encoding content for virtual, augmented, or mixed reality (xR) applications in connectivity-constrained environments.

BACKGROUND

As the value and use of information continues to increase, individuals and businesses seek additional ways to process and store information. One option available to users is Information Handling Systems (IHSs). An IHS generally processes, compiles, stores, and/or communicates information or data for business, personal, or other purposes thereby allowing users to take advantage of the value of the information. Because technology and information handling needs and requirements vary between different users or applications, IHSs may also vary regarding what information is handled, how the information is handled, how much information is processed, stored, or communicated, and how quickly and efficiently the information may be processed, stored, or communicated. The variations in IHSs allow for IHSs to be general or configured for a specific user or specific use such as financial transaction processing, airline reservations, enterprise data storage, or global communications. In addition, IHSs may include a variety of hardware and software components that may be configured to process, store, and communicate information and may include one or more computer systems, data storage systems, and networking systems.

IHSs may be used to produce virtual, augmented, or mixed reality (xR) applications. The goal of virtual reality (VR) is to immerse users in virtual environments. A conventional VR device obscures a user's real-world surroundings, such that only digitally-generated images remain visible. In contrast, augmented reality (AR) and mixed reality (MR) operate by overlaying digitally-generated content or entities (e.g., characters, text, hyperlinks, images, graphics, etc.) upon the user's real-world, physical surroundings. A typical AR/MR device includes a projection-based optical system that displays content on a translucent or transparent surface of an HMD, heads-up display (HUD), eyeglasses, or the like (collectively "HMDs").

In various implementations, HMDs may be tethered to an external or host IHS. Most HMDs do not have as much processing capability as the host IHS, so the host IHS is used to generate the digital images to be displayed by the HMD. The HMD transmits information to the host IHS regarding the state of the user, which in turn enables the host IHS to determine which image or frame to show to the user next, and from which perspective, as the user moves in space.

SUMMARY

Embodiments of systems and methods for encoding content for virtual, augmented, or mixed reality (xR) applications in connectivity-constrained environments are described. In an illustrative, non-limiting embodiment, an Information Handling System (IHS) may include a processor and a memory coupled to the processor, the memory having program instructions stored thereon that, upon execution by the processor, cause the IHS to: receive sensor information from a Head-Mounted Device (HMD) worn by a user during execution of an xR application; calculate, based on the sensor information, a priority of each of a plurality of Regions-of-Interest (ROIs) within one or more images produced by a rendering engine; and indicate the priorities to a video encoder, where the video encoder is configured to use each priority to control at least one of: (a) visual fidelity, or (b) resilience of a corresponding ROI transmitted by the IHS to the HMD in a video signal during execution of the xR application.

The sensor information may include a plurality of Simultaneous Localization And Mapping (SLAM) landmarks. For example, the sensor may be an Infra-Red (IR) or Near-IR (NIR) camera mounted on the HMD. In some cases, the SLAM landmarks may include one or more selected SLAM landmarks, among the plurality of SLAM landmarks, with a Kalman Gain above a threshold value. To calculate the priority of each of the plurality of ROIs, the program instructions, upon execution by the processor, may cause the IHS to select a subset of one or more ROIs closest to the SLAM landmarks.

To indicate the priorities, the program instructions, upon execution by the processor, may cause the IHS to: map each ROI into a left ROI and a right ROI; quantize the left and right ROIs; and provide at least a portion of the quantized left and right ROIs to the video encoder via an Application Programming Interface (API) command. The API command may be usable by the video encoder to allocate more bandwidth to the transmission of the quantized left and right ROIs relative to other portions of the one or more images in the video signal.

In other cases, the sensor information comprises a gaze vector captured by an Eye-Gaze Tracking (EGT) camera mounted on the HMD. To calculate the priority for each of the plurality of ROIs, the program instructions, upon execution by the processor, may cause the IHS to select a subset of one or more ROIs nearest an object of gaze interaction in the xR application. Each priority may include an adaptive intra-refresh rate selected based upon at least one of: (i) a size of a corresponding ROI; or (ii) a measure of packet loss.

The program instructions, upon execution by the processor, may also cause the IHS to: calculate, based on the sensor information, a priority of each of a plurality of audio ROIs; and indicate the priorities to an audio encoder, wherein the audio encoder is configured to use each priority to control at least one of: (a) audio fidelity, or (b) resilience of a corresponding audio ROI transmitted by the IHS to the HMD in an audio signal during execution of the xR application.

In another illustrative, non-limiting embodiment, a method may include receiving sensor information from a Head-Mounted Device (HMD) worn by a user during execution of an xR application; calculating, based on the sensor information, a priority of each of a plurality of audio ROIs; and indicating the priorities to an audio encoder, where the audio encoder is configured to use each priority to control at least one of: (a) audio fidelity, or (b) resilience of a corresponding audio ROI transmitted by the IHS to the HMD in an audio signal during execution of the xR application.

In some cases, the sensor information may include SLAM landmarks captured by an IR or NIR camera mounted on the HMD. Calculating the priority may include selecting one or more SLAM landmarks, among the plurality of SLAM landmarks, with a Kalman Gain above a threshold value. The method may also include mapping the selected SLAM landmarks to a coordinate space used to reproduce 3D audio and selecting a subset of one or more audio ROIs closest to the SLAM landmarks.

In other cases, the sensor information may include a gaze vector captured by an EGT camera mounted on the HMD. The method may also include selecting a subset of one or more ROIs nearest an object of gaze interaction in the xR application.

The method may further include calculating, based on the sensor information, a priority of each of a plurality of ROIs within one or more images produced by a rendering engine, and indicating the priorities to a video encoder, where the video encoder is configured to use each priority to control at least one of: (a) visual fidelity, or (b) resilience of a corresponding ROI transmitted by the IHS to the HMD in a video signal during execution of the xR application.

In yet another illustrative, non-limiting embodiment, a hardware memory of an HMD wearable by a user may have program instructions stored thereon that, upon execution by a processor, cause the HMD to: transmit, to an IHS, frames captured by an NIR camera mounted on the HMD, where the frames are usable by the IHS to perform SLAM of the HMD during execution of an xR application; and receive a video signal encoded by the IHS, at least in part, using SLAM landmarks detected in the frames.

The IHS may be configured to calculate, based on the SLAM landmarks, a priority of each of a plurality of ROIs within one or more images produced by a rendering engine; and indicate the priorities to a video encoder, where the video encoder is configured to use each priority to control at least one of: (a) visual fidelity, or (b) resilience of a corresponding ROI transmitted in the video signal.

BRIEF DESCRIPTION OF THE DRAWINGS

The present invention(s) is/are illustrated by way of example and is/are not limited by the accompanying figures. Elements in the figures are illustrated for simplicity and clarity, and have not necessarily been drawn to scale.

DETAILED DESCRIPTION

Embodiments described herein provide systems and methods for encoding content for virtual, augmented, or mixed reality (xR) applications in connectivity-constrained environments. These techniques are particularly useful in xR applications that employ Head-Mounted Devices (HMDs), Heads-Up Displays (HUDs), and eyeglasses—collectively referred to as "HMDs."

Figure 1:
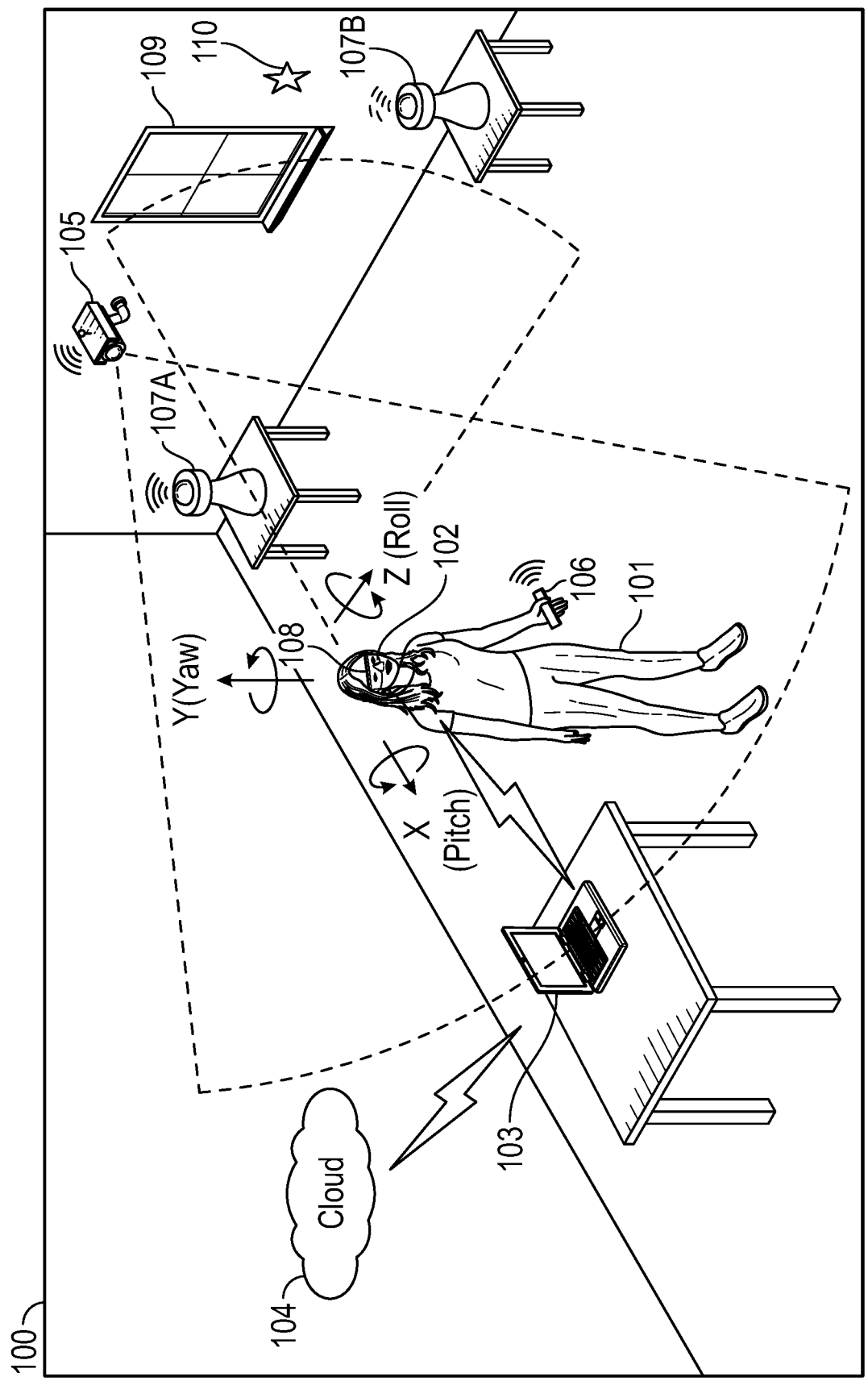
FIG. 1 illustrates an example of an environment where a virtual, augmented, or mixed reality (xR) application may be executed, according to some embodiments.

FIG. 1 is a perspective view of an example of physical environment 100 where an xR application is executed. In various embodiments, user 101 may wear HMD 102 around their heads and over their eyes, during execution of an xR application. An xR application may include a subset of components or objects executed by HMD 102 and another subset of components or objects executed by host IHS 103.

HMD 102 may be tethered to host IHS 103 via a wired or wireless connection. Particularly, host IHS 103 may be used to generate digital images to be displayed by HMD 102. HMD 102 transmits information to host IHS 103 regarding the state of user 101 (e.g., physical position, head orientation, gaze focus, etc.), which in turn enables host IHS 103 to determine which image or frame to show to the user next, and from which perspective.

For instance, as user 101 moves about environment 100, any change in: (i) physical location (e.g., x, y, and z) or translation; or (ii) orientation (e.g., pitch, yaw, and roll) or rotation, may cause host IHS 103 to effect a corresponding change in the picture or symbols displayed to user 101 via HMD 102. These changes may be detected by HMD 102 and processed by host IHS 103, for example, to maintain congruence with the outside world and/or to allow user 101 to look around a consistent xR environment.

In some implementations, host IHS 103 may execute a runtime or rendering engine, such as UNITY, UNREAL, AUTODESK, etc., which produces a visual xR model displayed by HMD 102 from a unique point-of-view, based upon the location, pose, and/or gaze of user 101—which may be determined, at least in part, using Simultaneous Localization and Mapping (SLAM).

As used herein, the term SLAM refers systems and methods that use positional tracking devices to construct a map of an unknown environment where an HMD is located, and that simultaneously identifies where the HMD is located, its orientation, and/or pose.

To enable positional tracking for SLAM purposes, HMD 102 may use wireless, inertial, acoustic, or optical sensors. And, in many embodiments, each different SLAM method may use a different positional tracking source or device. For example, wireless tracking may use a set of anchors or lighthouses 107A-B that are placed around the perimeter of environment 100 and/or one or more totems 106 or tags 110 that are tracked; such that HMD 102 triangulates its position and/or state using those elements.

Inertial tracking may use data from accelerometers and gyroscopes within HMD 102 to find a velocity and position of HMD 102 relative to some initial point. Acoustic tracking may use ultrasonic sensors to determine the position of HMD 102 by measuring time-of-arrival and/or phase coherence of transmitted and receive sound waves.

Optical tracking may include any suitable computer vision algorithm and tracking device, such as a camera of visible, infrared (IR), or near-IR (NIR) range, a stereo camera, and/or a depth camera (IR covers a portion of the electromagnetic spectrum from approximately 0.9 µm to 14 µm). With inside-out tracking using markers, for example, camera 108 may be embedded in HMD 102, and infrared markers 107A-B or tag 110 may be placed in known stationary locations. With outside-in tracking, camera 105 may be placed in a stationary location and infrared markers 106 may be placed on HMD 102 or held by user 101. In others cases, markerless inside-out tracking may use continuous searches and feature extraction techniques from video frames obtained by camera 108 (e.g., using visual odometry) to find natural visual landmarks (e.g., window 109) in environment 100.

In some cases, an IR or NIR SLAM camera may be further configured to capture thermographic images of target objects, and to provide accurate non-contact temperature measurements of those objects.

Figure 2:
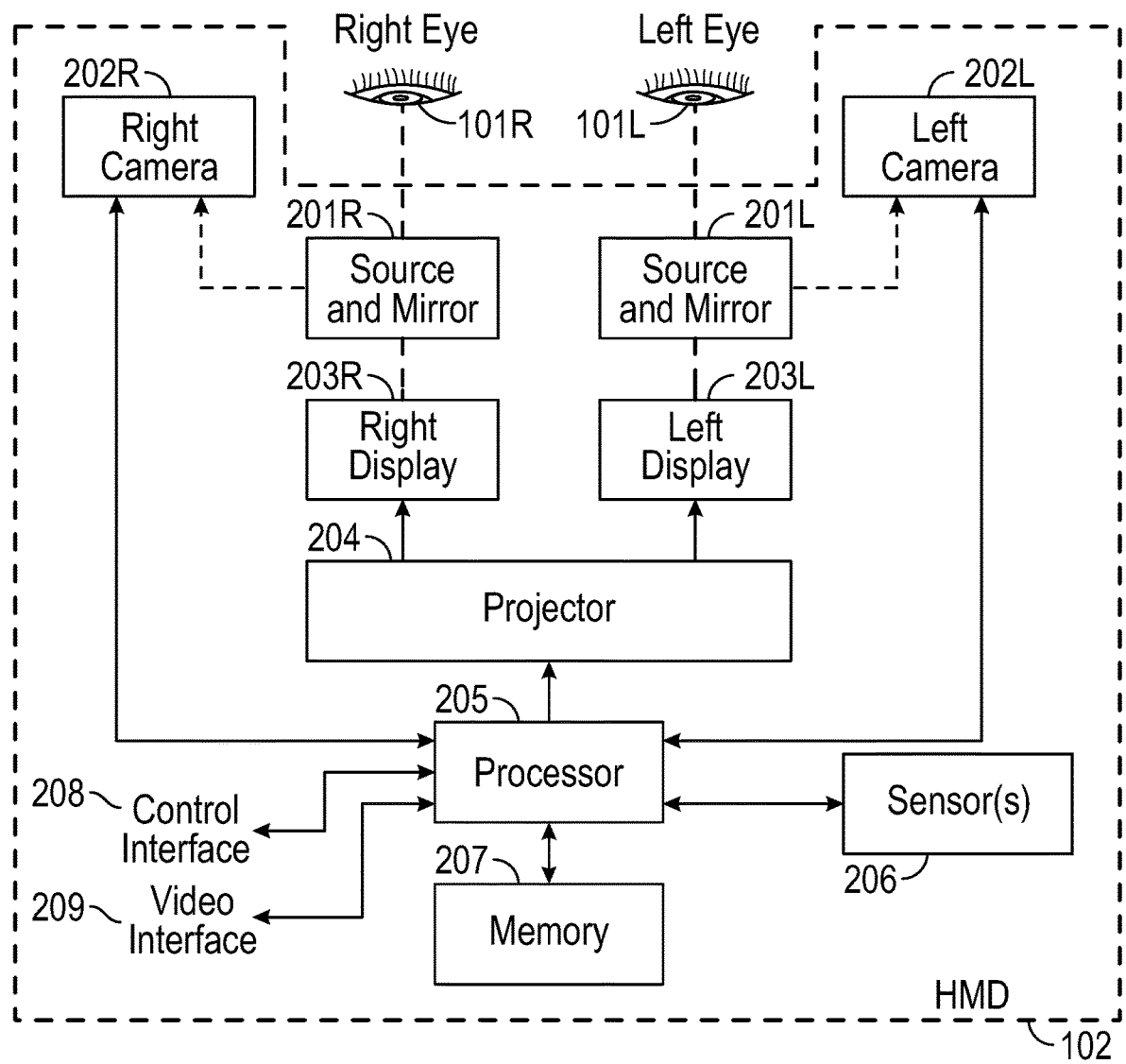
FIG. 2 illustrates an example of electronic components of a Head-Mounted Display (HMD), according to some embodiments.

FIG. 2 illustrates an example of electronic components of HMD 102. In some embodiments, HMD 102 comprises a projection system that includes projector 204 configured to display image frames, including stereoscopic right and left images, on right and left displays 203R and 203L that are viewed by a user right and left eyes 101R and 101L, respectively. Such a projection system may include, for example, a Digital Light Processing (DLP), a Liquid Crystal Display (LCD), or the like. To create a three-dimensional (3D) effect in a 3D virtual view, virtual objects (VOs) may be rendered at different depths or distances in the two images.

HMD 102 includes processor 205 configured to generate frames that are displayed by projector 204. Hardware memory 207 is configured to store program instructions executable by processor 205, as well as other data. In other embodiments, however one or more operations described for processor 205 may be implemented by a different processor within IHS 103.

Accordingly, in some embodiments, HMD 102 may also include control interface 208 and video interface 209 (e.g., a Bluetooth technology interface, USB interface, etc.) configured to communicate with IHS 103. Control interface 208 may provide forward and backward communication channels between HMD 102 and IHS 103, depending upon the architecture of the xR system, to facilitate execution of an xR application. For example, program instructions stored in memory 207, when executed by processor 205, may cause frames captured by camera(s) 108 to be transmitted to IHS 103 via control interface 208.

IHS 103 may in turn execute SLAM module 403 (FIG. 4), for example, based upon landmarks found in the video frames received from camera 108. Particularly, SLAM module 403 may be configured to implement tracking techniques that use distinctive visual characteristics of the physical environment to identify specific images or shapes which are then usable to calculate HMD 102's position and orientation. Then, rendering engine 406 (FIG. 4) may use data from SLAM module 403 to render an image to be provided to projector 204 via video interface 209 (e.g., High-Definition Multimedia Interface or "HDMI," Digital Visual Interface or "DVI," DISPLAYPORT, etc.). In some cases, video interface 209 may include two separate video interfaces, one for each display 203R/L. Additionally, or alternatively, a single interface that supports multi-stream may be used to drive both displays 203R/L.

In some embodiments, HMD 102 may include one or more sensors 206 that collect information about the user's environment (e.g., video, depth, lighting, motion, etc.) and provide that information to processor 205. Sensors 206 may include, but are not limited to, inside-out cameras, outside-in cameras, eye tracking cameras, RGB cameras, gesture cameras, infrared (IR) or near-IR (NIR) cameras, SLAM cameras, etc. Additionally, or alternatively, sensors 206 may include electric, magnetic, radio, optical, infrared, thermal, force, pressure, acoustic, ultrasonic, proximity, position, deformation, movement, velocity, rotation, gyroscopic, and/or acceleration sensor(s). In some cases, sensors 206 may be coupled to processor 205 via a sensor hub.

HMD 102 may be configured to render and display frames to provide an xR view for user 101 according to inputs from sensors 206. For example, an xR view may include renderings of the user's real-world environment based on video captured by camera 108. The xR view may also include virtual objects composited with the projected view of the user's real environment.

Still referring to FIG. 2, right and left Near Infra-Red (NIR) light sources 201R and 201L (e.g., NIR LEDs) may be positioned in HMD 102 to illuminate the user's eyes 101R and 101L, respectively. Mirrors 201R and 201L (e.g., "hot mirrors") may be positioned to direct NIR light reflected from eyes 101R and 101L into EGT cameras 202R and 202L located on each side of the user's face. In other implementations, instead of EGT cameras 202R and 202L, a single EGT camera, or a combination of a wide-angle camera with and a narrower-angle camera, may be used.

EGT information captured by cameras 202R and 202L may be provided to processor 205 to be further processed and/or analyzed. For example, processor 205 may adjust the rendering of images to be projected, and/or it may adjust the projection of the images by the projector 204 based on the direction and angle at which eyes 101R/L are looking. Additionally, or alternatively, processor 205 may estimate the point of gaze on right and left displays 203R and 203L to enable gaze-based interaction with xR content shown on those displays.

For purposes of this disclosure, an IHS may include any instrumentality or aggregate of instrumentalities operable to compute, calculate, determine, classify, process, transmit, receive, retrieve, originate, switch, store, display, communicate, manifest, detect, record, reproduce, handle, or utilize any form of information, intelligence, or data for business, scientific, control, or other purposes. For example, an IHS may be a personal computer (e.g., desktop or laptop), tablet computer, mobile device (e.g., Personal Digital Assistant (PDA) or smart phone), server (e.g., blade server or rack server), a network storage device, or any other suitable device and may vary in size, shape, performance, functionality, and price. An IHS may include Random Access Memory (RAM), one or more processing resources such as a Central Processing Unit (CPU) or hardware or software control logic, Read-Only Memory (ROM), and/or other types of nonvolatile memory.

Additional components of an IHS may include one or more disk drives, one or more network ports for communicating with external devices as well as various I/O devices, such as a keyboard, a mouse, touchscreen, and/or a video display. An IHS may also include one or more buses operable to transmit communications between the various hardware components. An example of an IHS is described in more detail below.

Figure 3:
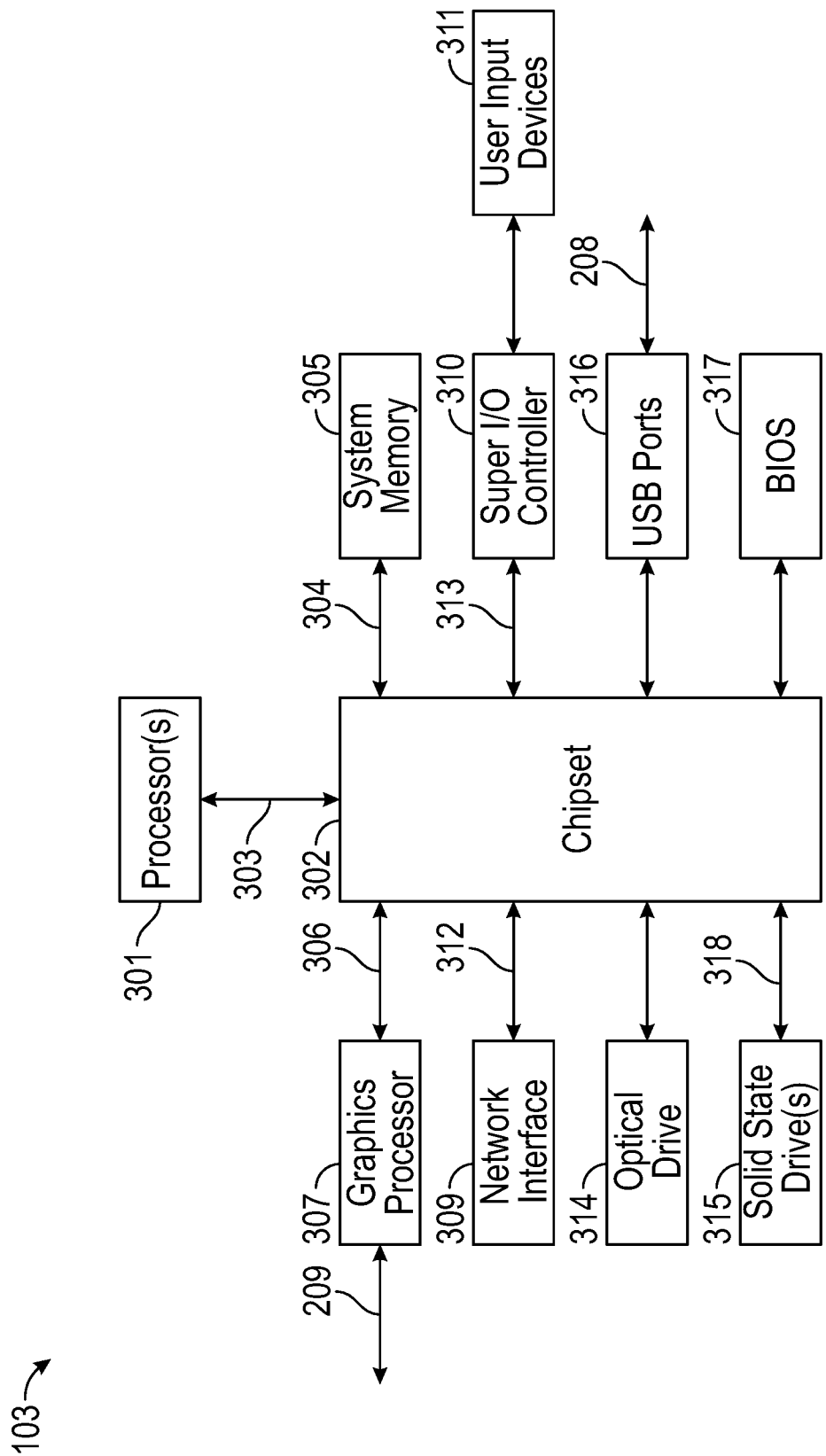
FIG. 3 illustrates an example of electronic components of an Information Handling System (IHS), according to some embodiments.

FIG. 3 is a block diagram of host IHS 103, according to certain embodiments. As shown, IHS 103 may include one or more processors 301. In various implementations, IHS 103 may be a single-processor system including one processor 301, or a multi-processor system including two or more processors 301. Processor(s) 301 may include any processor capable of executing program instructions, such as an Intel Pentium™ series processor or any general-purpose or embedded processors having any of a variety of Instruction Set Architectures (ISAs), such as the x86, POWERPC®, ARM®, SPARC®, or MIPS® ISAs, or any other suitable ISA.

IHS 103 includes chipset 302 that may include one or more integrated circuits that are connect to processor(s) 301. In certain embodiments, chipset 302 may utilize QuickPath Interconnect (QPI) bus 303 for communicating with the processor(s) 301. Chipset 302 provides the processor(s) 301 with access to a variety of resources. For instance, chipset 302 provides access to system memory 305 over memory bus 304. System memory 305 may be configured to store program instructions and/or data accessible by processors(s) 301. In various embodiments, system memory 305 may be implemented using any suitable memory technology, such as static RAM (SRAM), dynamic RAM (DRAM) or nonvolatile/Flash-type memory.

Chipset 302 may also provide access to graphics processor 307. In certain embodiments, graphics processor 307 may be comprised within one or more video or graphics cards that have been installed as components of IHS 103. Graphics processor 307 may be coupled to chipset 302 via graphics bus 306 such as provided by an Accelerated Graphics Port (AGP) bus or a Peripheral Component Interconnect Express (PCIe) bus. In certain embodiments, graphics processor 307 generates display signals and provides them to HMD device 102 via video interface 209.

In certain embodiments, chipset 302 may also provide access to one or more user input devices 311. In such embodiments, chipset 302 may be coupled to a super I/O controller 310 that provides interfaces for a variety of user input devices 311, in particular lower bandwidth and low data rate devices. For instance, super I/O controller 310 may provide access to a keyboard and mouse or other peripheral input devices. In certain embodiments, super I/O controller 310 may be used to interface with coupled user input devices 311 such as keypads, biometric scanning devices, and voice or optical recognition devices, through wired or wireless connections. In certain embodiments, chipset 302 may be coupled to the super I/O controller 310 via a Low Pin-Count (LPC) bus 313.

Other resources may also be coupled to the processor(s) 301 of IHS 103 through chipset 302. In certain embodiments, chipset 302 may be coupled to a network interface 309, such as provided by a Network Interface Controller (NIC) that is coupled to IHS 103. In certain embodiments, the network interface 309 may be coupled to chipset 302 via a PCIe bus 312. According to various embodiments, network interface 309 may support communication via various wired and/or wireless networks. In certain embodiments, chipset 302 may also provide access to one or more Universal Serial Bus (USB) ports 316; which in some implementations may serve as transport for establishing control interface 208 with HMD 102.

Chipset 302 also provides access to one or more solid-state storage devices 315. Chipset 302 utilizes a PCIe bus interface connection 318 in order to communication with the solid-state storage device 315. In certain embodiments, chipset 302 may also provide access to other types of storage devices. For instance, in addition to the solid-state storage device 315, an IHS 103 may also utilize one or more magnetic disk storage devices, or other types of the storage devices such as an optical drive or a removable-media drive. In various embodiments, the solid-state storage device 315 may be integral to IHS 103, or may be located remotely from IHS 103.

Another resource that may be accessed by processor(s) 301 via chipset 302 is a Basic Input/Output System (BIOS) 317. As described in more detail below with respect to additional embodiments, upon powering or restarting IHS 103, processor(s) 301 may utilize BIOS 317 instructions to initialize and test hardware components coupled to IHS 103 and to load an operating system for use by IHS 103. BIOS 317 provides an abstraction layer that allows the operating system to interface with certain hardware components that are utilized by IHS 103. Via this hardware abstraction layer provided by BIOS 317, the software executed by the processor(s) 301 of IHS 103 is able to interface with certain I/O devices that are coupled to IHS 103. As used herein, the term "BIOS" is intended to also encompass Unified Extensible Firmware Interface (UEFI).

In various embodiments, HMD 102 and/or host IHS 103 may not include each of the components shown in FIGS. 2 and 3, respectively. Additionally, or alternatively, HMD 102 and/or host IHS 103 may include various components in addition to those that are shown in FIGS. 2 and 3. Furthermore, some components that are represented as separate components in FIGS. 2 and 3 may, in some embodiments, be integrated with other components. For example, in various implementations, all or a portion of the functionality provided by the illustrated components may instead be provided by components integrated into the one or more processor(s) as a system-on-a-chip (SOC) or the like.

Figure 4:
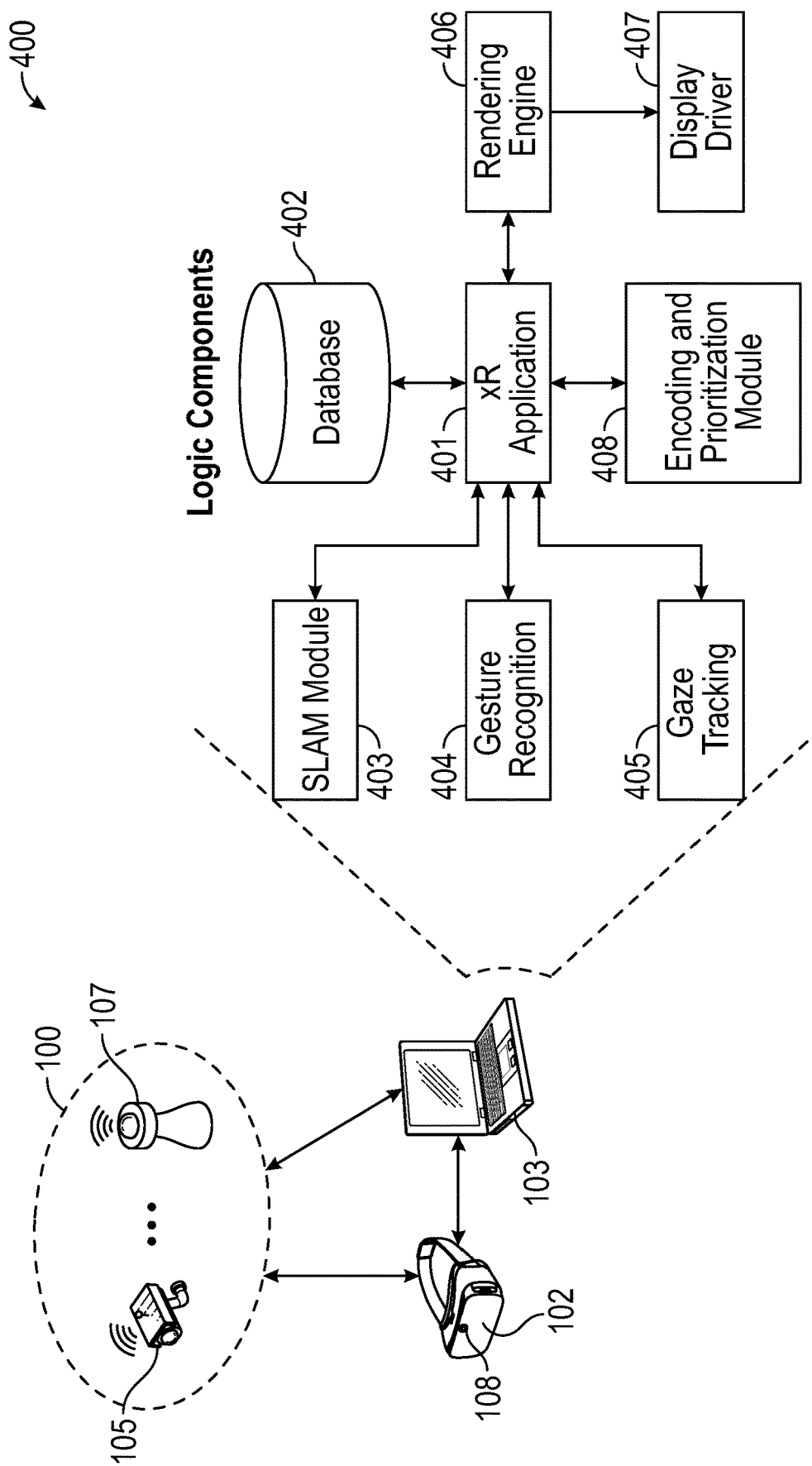
FIG. 4 illustrates an example of logic components of an xR application, according to some embodiments.

FIG. 4 illustrates logic components 400 of xR application 401. In various embodiments, logic components 400 may be executed by IHS 103 and/or HMD 102, such that sub-parts of each of logic components 400 may run on processor 205 of HMD 102 and/or 301 of IHS 103. Moreover, program instructions implementing logic components 400 may be stored in memory 207 of HMD 102 and/or memory 305 of IHS 103.

Generally speaking, xR application 401 may include any type of application now existing or yet to be developed, including, but not limited to: entertainment, video games, robotics, healthcare, education and training, military uses, occupational safety, engineering, industrial or product design, collaboration applications, virtual meetings, etc. Moreover, any data required or otherwise used during operation of xR application 401 may be stored in database 402, discussed in more detail below.

SLAM module 403 uses positional tracking devices to construct a map of an unknown environment where HMD 102 is located, which simultaneously identifies where the HMD is located, its orientation, and/or pose. Generally, SLAM module 403 may include a propagation component, a feature extraction component, a mapping component, and an update component. The propagation component may receive angular velocity and accelerometer data from an Inertial Measurement Unit (IMU) built into HMD 102, for example, and it may use that data to produce a new HMD position and/or pose estimation. A camera (e.g., a depth-sensing camera) may provide video frames to the feature extraction component, which extracts useful image features (e.g., using thresholding, blob extraction, template matching, etc.), and generates a descriptor for each feature. These features, also referred to as "landmarks," are then fed to the mapping component.

The mapping component may be configured to create and extend a map, as HMD 102 moves in space. Landmarks may also be sent to the update component, which updates the map with the newly detected feature points and corrects errors introduced by the propagation component. Moreover, the update component may compare the features to the existing map such that, if the detected features already exist in the map, the HMD's current position may be determined from known map points.

An estimator, such as an Extended Kalman filter (EKF), may be used for handling the propagation component of an inside-out SLAM method. A map may be generated as a vector stacking sensors and landmarks states, modeled by a Gaussian variable. The map may be maintained using predictions (e.g., when HMD 102 moves) and/or corrections (e.g., camera 108 observes landmarks in the environment that have been previously mapped). In other cases, a map of environment 100A may be obtained, at least in part, from cloud 104.

For example, HMD 102 may capture IR/NIR frames (e.g., from camera 108), perform image pre-processing operations, generate object detection of landmarks using feature extraction techniques, and send SLAM data (e.g., pixel values for each pixel, along with IR/NIR frame data, coordinates of detected landmarks, etc.) to host IHS 103. Host IHS 103 may perform EKF operations for each detected landmark and it may calculate a Kalman Gain (G) for each landmark (L), which in turn indicates a confidence or probability of the landmark's measured location being accurate.

Gesture recognition module 404 may use one or more cameras or optical sensors that enable user 101 to use their actual hands for interaction with virtual objects (VOs) rendered by projector 204 within HMD 102. For example, gesture recognition module 404 may be configured to implement hand tracking and gesture recognition in a 3-D space via a user-facing 2-D camera. In some cases, gesture recognition module 404 may track a selectable number of degrees-of-freedom (DOF) of motion, with depth information, to recognize dynamic hand gestures (e.g., swipes, clicking, tapping, grab and release, etc.) usable to control or otherwise interact with xR application 401.

Gesture detection begins when video frame data (e.g., a video or depth-video stream) is received at host IHS 103 from gesture or RGB camera 108 of HMD 102. In some implementations, video data may have already been processed, to some degree, by processor 205 of HMD 102. Then, the video data is further processed by processors 302 and/or 307 in IHS 103 to control aspects of xR application 401, by identifying various gestures and sequences that constitute user input. At least a portion of the user's body may be identified in the video frame data obtained using gesture or RGB camera 108. For example, through image processing, a given locus of a video frame or depth map may be recognized as belonging to user 101. Pixels that belong to user 101 (e.g., arms, hands, fingers, etc.) may be identified, for example, by sectioning off a portion of the video frame or depth map that exhibits above-threshold motion over a suitable time scale, and attempting to fit that section to a geometric model of user 101. If a suitable fit is achieved, then pixels in that section may be recognized as those of user 101.

Gesture recognition module 404 may be configured to analyze pixels of a video frame or depth map that correspond to user 101, in order to determine what part of the user's body each pixel represents. A number of different body-part assignment techniques may be used. In an example, each pixel of the video frame or depth map may be assigned a body-part index. The body-part index may include a discrete identifier, confidence value, and/or body-part probability distribution indicating the body part or parts to which that pixel is likely to correspond. Machine learning may be used to assign each pixel a body-part index and/or body-part probability distribution. Such a machine learning method may analyze a user with reference to information learned from a previously trained collection of known gestures and/or poses stored in a calibration database. During a supervised training phase, for example, a variety of gesture sequences may be observed, and trainers may provide label various classifiers in the observed data. The observed data and annotations may then be used to generate one or more machine-learned algorithms that map inputs (e.g., observation data from a depth camera) to desired outputs (e.g., body-part indices for relevant pixels).

Thereafter, a partial virtual skeleton may be fit to at least one body part identified. In some embodiments, a partial virtual skeleton may be fit to the pixels of video frame or depth data that correspond to a human arm, hand, and/or finger(s). A body-part designation may be assigned to each skeletal segment and/or each joint. Such virtual skeleton may include any type and number of skeletal segments and joints, including each individual finger). By analyzing positional change in the various skeletal joints and/or segments, certain corresponding movements that indicate predetermined gestures, actions, or behavior patterns of user 101 may be identified. In other embodiments, the use of a virtual skeleton may not be necessary. For example, in other implementations, raw point-cloud data may be sent directly to a feature extraction routine within a gesture recognition module.

Examples of one and two-handed gestures that may be recognized or tracked by gesture recognition module 404 include, but are not limited to: gestures for selecting and deselecting VOs, gestures for manipulating selected VOs (e.g., rotation and/or translation following the user's hand direction, position, and/or location), gestures for performing menu operations such as opening, closing, and/or repositioning (again, with menu rotation and/or translation following the user's hand), and gestures for manipulating applications, windows, or workspaces (e.g., using downward or upward swiping hand motion), among many others.

Gaze tracking module 405 may use an inward-facing projector, configured to create a pattern of infrared or (near-infrared) light on the user's eyes, and an inward-facing camera configured to take high-frame-rate images of the eyes and their reflection patterns; which are then used to calculate the user's eye's position and gaze focus or point. In some cases, gaze tracking module 405 may be configured to identify a direction, extent, and/or speed of movement of the user's eyes in real-time, during execution of an xR application (e.g., a gaze vector). In addition, gaze tracking module 405 may be configured to calculate a region-of-interest of configurable size or shape (e.g., circular, rectangular, etc.), based in part upon the gaze vector.

As used herein, the term "gaze vector" is defined as a group of variables calculated using reflections from pupil center and another set of glints generated in the user's eye. In some cases, a gaze vector may include one or more of the following variables: 3D coordinates (x, y, z) of an initial point (e.g., the midpoint between the user's eyes), and pitch and yaw direction angles.

In various implementations, gaze tracking module 405 may use, among camera(s) and/or sensor(s), NIR light sources to produce glints on the surface of the cornea of the user's eye, and then it may capture images of the eye region using an inward-facing camera. Gaze tracking module 405 may estimate the user's gaze from the relative movement between the pupil center and glint positions. Particularly, an eye and/or gaze tracking algorithm may perform corneal reflection-based calculations that use MR illumination to estimate the gaze direction or the point of gaze using polynomial functions, or a geometrical model of the human eye.

To perform gaze estimation, gaze tracking module 405 may estimate the visual axis and kappa angle of the user's eye, for each user, as part of a calibration operation. Calibration may be performed by showing the user a set of visual targets distributed over the HMD's display, and the user may be asked to gaze at them for a certain amount of time. The inward-facing camera may capture the various eye positions for each target point, which are then mapped to corresponding gaze coordinates.

In some cases, gaze tracking module 405 may be configured to compensate for head movement. For example, a mathematical formula indicating the correspondence of eye gaze with head positions may represent a relationship between user reference gaze directions, head pose direction, and actual gaze direction; which is a result of both head and eye rotation.

In various embodiments, gaze tracking module 405 may perform any of a plurality of different EGT methods. For example, in two-dimensional (2D) regression-based EGT methods, a vector between the pupil center and a corneal glint may be mapped to corresponding gaze coordinates on the frontal screen using a polynomial transformation function. Conversely, three-dimensional (3D)-based EGT methods may use a geometrical model of the human eye to estimate the center of the cornea, optical and visual axes of the eye, and to estimate the gaze coordinates as points of intersection where the visual axes meets the scene.

As such, in various embodiments, gaze tracking module 405 may produce, collect, measure, and/or produce information about a user's intent, cognitive processes, and behavior, based upon the user's eye movements, that may include, but is not limited to: (A) Fixations: phases when the eyes are stationary between movements and visual input occurs (e.g., total fixation duration, mean fixation duration, fixation spatial density, number of areas fixated, fixation sequences and fixation rate); (B) Saccades: rapid and involuntary eye movements that occur between fixations (e.g., saccade number, amplitude and fixation-saccade ratio); (C) Scanpath: a series of short fixations and saccades alternating before the eyes reach a target location on the screen (e.g., scanpath direction, duration, length and area covered); (D) Gaze duration: a sum of all fixations made in an area of interest before the eyes leave that area and also the proportion of time spent in each area; and/or (E) Pupil size and blink: measures used to study cognitive workload.

Based upon the foregoing, gaze tracking module 405 may be configured to follow the user's gaze direction for natural exploration of a visual scene by capturing the user's visual perspective. Moreover, gaze tracking module 405 may also be configured to estimate user gaze and blink-state for interacting with the xR environment; several types of eye movements and gestures, such as saccades, smooth pursuit and nod-roll may be used. For example, gaze tracking module 405 may be configured to use gaze, dwell time, and half-blink information for the purpose of hands-free object selection. Multiple input parameters may be used to avoid accidental selection of items. Pupil motion may be tracked to estimate a user's viewing point, with Kalman filtering to minimize pupil jitter and drifts.

Rendering engine 406 may include any engine (e.g., UNITY, UNREAL, AUTODESK, etc.) configured to render an xR model or virtual space displayed by HMD 102 from user 101's unique point-of-view based upon the user's coordinate location (e.g., from SLAM module 403), the user's pose (e.g., from an IMU), and/or the user's gaze (e.g., from gaze tracking module 405). Display driver 407 is coupled to rendering engine 406 and configured to convert rendered video frames to a display format that HMD 102 can reproduce before the user's' eyes.

Encoding and prioritization module 408 may implement any method for selecting and prioritizing video and/or audio Regions of Interest (ROIs), slices, or channels, based on context information, which may then be used for encoding content in connectivity-constrained communications between IHS 103 and HMD 102. Moreover, encoding and prioritization module 408 may be configured to provide software services described in FIGS. 5 and 6.

Database 402 may include if/then rules with real-world objects and their location, orientation, and/or movement (e.g., angle(s), direction(s), trajector(ies), speed(s), etc.). In some cases, an if/then rule catalog may be filtered based upon the presence or identification of a master object and/or other surrounding, secondary objects in the user's FOV. Database 402 may include different if/then rule catalogs based upon the identity of an authenticated user, for example, as part of a profile. Additionally, or alternatively, if/then rules may be based upon historic continuous usage.

As used herein, the terms "transformation matrix" or "transform matrix" refer to matrices that determine how objects move around in space. For example, in some cases a transform matrix may be a 4×4 matrix that defines a transformation when applied to objects: translation, rotation and scaling. Translating an object moves it in space, rotating turns an object around its center, and scaling changes the size of an object. To apply a transform to a 3D object, such as a VO, every vertex in the 3D object may be multiplied by the transformation matrix.

When rendering engine 406 is operating, it needs to know where to place the "view camera" (i.e., the point of view for the render) in a given scene, which is done using a view matrix. For example, in some cases a view matrix may be a 4×4 matrix that contains information about the position and orientation of a viewing camera. Every vertex in the scene or frame may be multiplied the view matrix and the scene is rendered by HMD 102 (although the view matrix says how everything else in the scene should change to reflect the point of view of the camera, the camera itself does not move).

The inverse of the view matrix is referred to as the camera transform matrix, which describes how camera 108 itself moves around a scene or frame. That is, the camera transform matrix provides the position and rotation of camera 108.

To illustrate the distinction between a transform matrix and a view matrix, consider a scene that starts with camera 108 looking directly at a chair that is positioned in front of it. The user then turns the camera 45 degrees to the right (a). In this case the camera transform matrix would be a rotation matrix that indicates a 45-degree rotation to the right. The view matrix, however, would be a rotation matrix that indicates 45-degree rotation to the left around the camera's position. In another scene, if the user turns to the left and walks forward, the camera transform matrix would be a rotation matrix to the left followed by a translation matrix forward, which indicates how the user moved in the frame.

For example, if the user looks to the right (and HMD 102 turns right), the camera transform matrix obtained from SLAM sensor data may include a rotation to the right. If the user looks to the left (and HMD 102 turns left), the camera transform matrix obtained from SLAM sensor data may include a rotation to the left. If the user looks up (and HMD 102 turns upward), the camera transform matrix obtained from SLAM sensor data may include a rotation upward. And if the user looks down (and HMD 102 turns downward), the camera transform matrix obtained from SLAM sensor data may include a rotation downward. More generally, rotations around any axis may be performed by taking a rotation around the x axis, followed by a rotation around the y axis, and followed by a rotation around the z axis—such that any spatial rotation can be decomposed into a combination of principal rotations. Moreover, if HMD 102 moves forward, backward, or sideways, the camera transform matrix obtained from SLAM sensor data also reflects the resulting translation.

The term "world space," for xR application 401, refers to a coordinate system that defines where everything is located inside the application. Every object handled by xR application 401 may be given an X, Y and Z coordinate relative to an origin. Once calibrated, HMD sensors can transform their sensor data into world space coordinates. Then, when transform matrices are applied to 3D objects, the objects are moved around in world space. For instance, world space coordinates may be used by xR application 401 to overlay virtual hands directly on-top of the user's real hands.

Most xR HMDs 102 are tethered, wired or wirelessly, to host IHS 103 (or a mobile platform) for compute purposes. In recent years, wirelessly tethered xR has started to gain increasing adoption, as well as investment in technology—yet wired connections between HMD 102 and IHS 103 are still widely in use today.

Architectures for tethered xR generally take the form of a server-client streaming architecture, with different transport layer mechanisms, such as Real-time Transport Protocol (RTP) over User Datagram Protocol (UDP)/Transmission Control Protocol (TCP), or the like. In various embodiments, IHS 103 is the server, which uses its own GPU (e.g., GPU 307 in FIG. 3) to render xR content using render engine 406, for example, to produce audio and 3D graphics with left (L) and right (R) views for display by the client, that is, HMD 102. As part of its rendering process, engine 406 may receive input from SLAM driver (e.g., SLAM module 403), which takes preprocessed SLAM IR camera frames from HMD 102 in order to render an updated world space camera view.

As the performance requirements of xR increase, connectivity becomes a key constraint to the overall performance of an xR solution. Connectivity constraints are particularly apparent in (but are not limited to) cases where HMD 102 is wirelessly tethered to IHS 103.

To preserve bandwidth, transmission of video content from IHS 103 to HMD 102 can involve a compression and/or encoding operation (of 3D, audio and other server data) by IHS 103, and then a corresponding decompression and/or decoding operation by HMD 102. In some cases, the encoding of 3D data may involve projecting 3D to 2D left and right eye views. A High Efficiency Video Coding (HEVC) or H.265 encoder, or an Advanced Video Coding (AVC) or H.264 encoder, may be used to produce 2D video frames; and audio may be encoded using Advanced Audio Coding (AAC), or the like.

Region-of-Interest (ROI) video encoding techniques and toolsets enables an audio/video (AV) encoder to focus more bits on certain regions of an image that need higher visual attention than other regions (e.g., a human face against a background of trees and leaves), and also help the video encoder control use variable encoding rates to prevent buffer underflow (if HMD 102 is displaying images from the buffer faster than IHS 103 can fill it) or overflow (if IHS 103 is delivering data to the buffer faster than HMD 102 consumes it) in the forward channel of a constrained-connectivity environment. Generally speaking, a visual ROI may include initial x-y coordinates, length and width (for a rectangular shape), in pixels.

In some implementations, systems and methods described herein may receive SLAM landmark information (e.g., distance, size, conditional probabilities, etc.) on per-frame basis, along with object detection and/or segmentation techniques, and it may apply them to the render engine's output. These systems and methods may aggregate ROIs using the SLAM data and communicate the aggregated ROIs as fast-start "video encode input frames" usable by the encoder via an Application Programming Interface (API). Additionally, or alternatively, systems and methods described herein may receive EGT information (e.g., gaze vector, gaze interaction, etc.), which may in turn indicate which part of the render engine's output has the user's attention or focus. These systems and methods may aggregate ROIs using EGT data and communicate the aggregated ROIs as fast-start "video encode input frames" usable by the encoder via an API.

In addition, error resilience toolsets in video and/or audio encoding may be used to recover from packet loss due to network degradation in a wireless or constrained connectivity environment. However, error resilience techniques require lower compression, which produces lower visual/auditory quality for a given max bitrate target for a constrained channel. To address this problem, resilience toolsets for AV encoding may be given a head start of "contextual information" to adding prioritized resilience to one or more ROIs (in the form of a particular region of a video frame or a particular audio channel).

In some implementations, systems and methods described herein may further calibrate an adaptive intra refresh rate, or "airRate" (e.g., 0 to 20% of a target, performed once at start) in response to ROI size and/or packet loss, received from the backchannel and stored in a Look-Up Table (LUT). Then, these systems and methods may determine resilience ROIs and look up and set airRates per encoded ROI (e.g., encoded as separate slice), and map to 2D left and right eye as video encode input frames, in the form of Slice ROI inputs (e.g., Flexible Macroblock Ordering (FMO) Allocation Map). Slice ROI data may be updated regularly or periodically, including at full frame rate (e.g., 90 fps) used for tracking, and ROIs may be transmitted as slices or slice groups in linear raster scan order.

Additionally, or alternatively, systems and methods described herein may provide calibration of an audio resilience method, such that an encoder may progressively enable channel coding redundancy) as a function of packet loss %, to be applied on a per channel basis to audio. Based on the aforementioned principles used for visual content, these systems and methods may progressively enable audio resilience per channel independently (including 3D spatial audio and assignment to 3D ROIs).

Systems and methods described herein may also determine resilience channels for audio, and enable protection from resilience toolsets on that channel all the way to redundant channel coding on audio channel. As such, these systems and methods may leverage contextual information from SLAM, render engine, EGT subsystems, etc. for intelligent allocation of resilience for content transmitted from IHS 103 to HMD 102.

Figure 5:
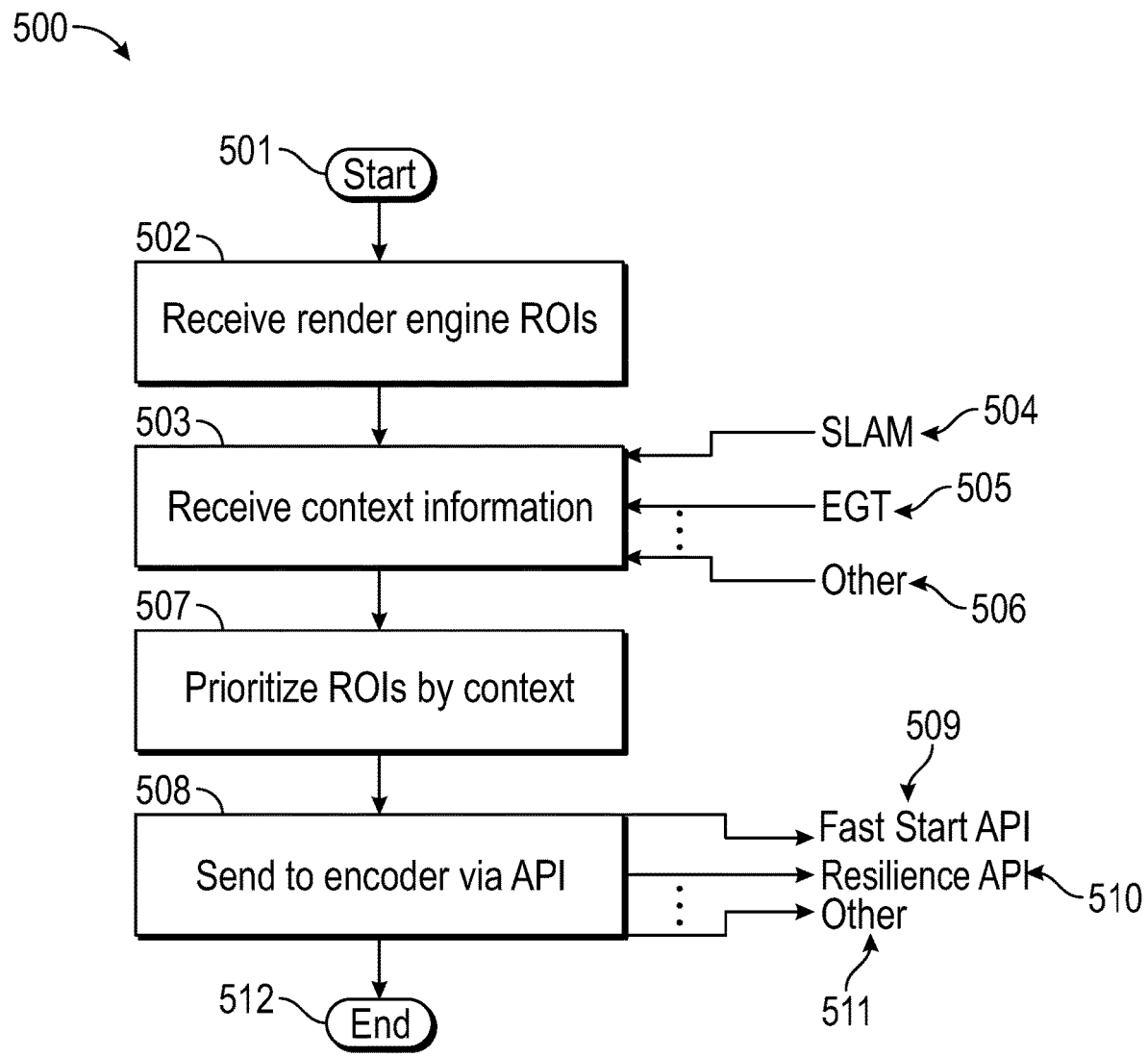
FIG. 5 illustrates an example of a method for encoding content for xR applications in connectivity-constrained environments, according to some embodiments.

FIG. 5 shows method 500 for encoding content for xR applications in connectivity-constrained environments. In various embodiments, method 500 may be performed by xR application 401 in cooperation with encoding and prioritization module 408. During execution of xR application 401, HMD 102 transmits camera and sensor data to IHS 103 via control interface 203. IHS 103 transmits encoded packetized rendered content (e.g., audio-video) to HMD 102 via video interface 204. As part of this process, encoding and prioritization module 408 may perform one or more operations.

Particularly, method 500 begins at block 501. At block 502, method 500 may receive a number of ROIs from a render engine (e.g., of x-y pixel size). At block 503, method 500 may receive context information from one or more sensors and/or services. For example, block 503 may receive SLAM landmarks 504, EGT data 505 (e.g., gaze vector), and/or other context information 506 (e.g., position of virtual object, application window, etc.).

At block 507, method 500 may prioritize ROIs of block 502 using the context information of block 503. For example, block 507 may rank ROIs by number of SLAM landmarks found within it, and/or by correspondence or matching of gaze direction. In some cases, ROIs from a rendering engine's output that have landmark rich areas (above a threshold value) may receive a larger weight than other ROIs covering landmark poor areas. In some cases, SLAM landmarks may be filtered by Kalman Gain to determine which landmarks are sufficiently reliable for confidence purposes (e.g., consider only Landmarks L that have a Kalman Gain G above a threshold value). Then, block 507 may apply transformation matrices and/or intersection algorithms to match the location of the higher-confidence SLAM landmarks to the render engine's ROIs in a common coordinate system.

At block 508, method 500 sends priority indications to the AV encoder using an Application Programming Interface (API). For example, each ROI may be assigned a priority value or weight relative to other ROIs (e.g., 1 to 3, or 1 to 10), and all ROIs may be ranked by order of priority from lowest to highest. In some cases, block 508 may produce fast start API command 509 with quantized L and R views for ROIs with highest priority. In other cases, block 508 may produce resilience API command 510 or other command 511 configured to provide priority information and/or resilience parameters (e.g., based on ROI size and packet loss) to the AV encoder, which in turn is configured to implement independent rate control, for example, by performing at least one of: (a) increasing a number of bits used in the communication for higher priority ROIs; or (b) decreasing a number of bits allocated in the communication for lower priority ROIs. Method 500 ends at block 512.

Figure 6:
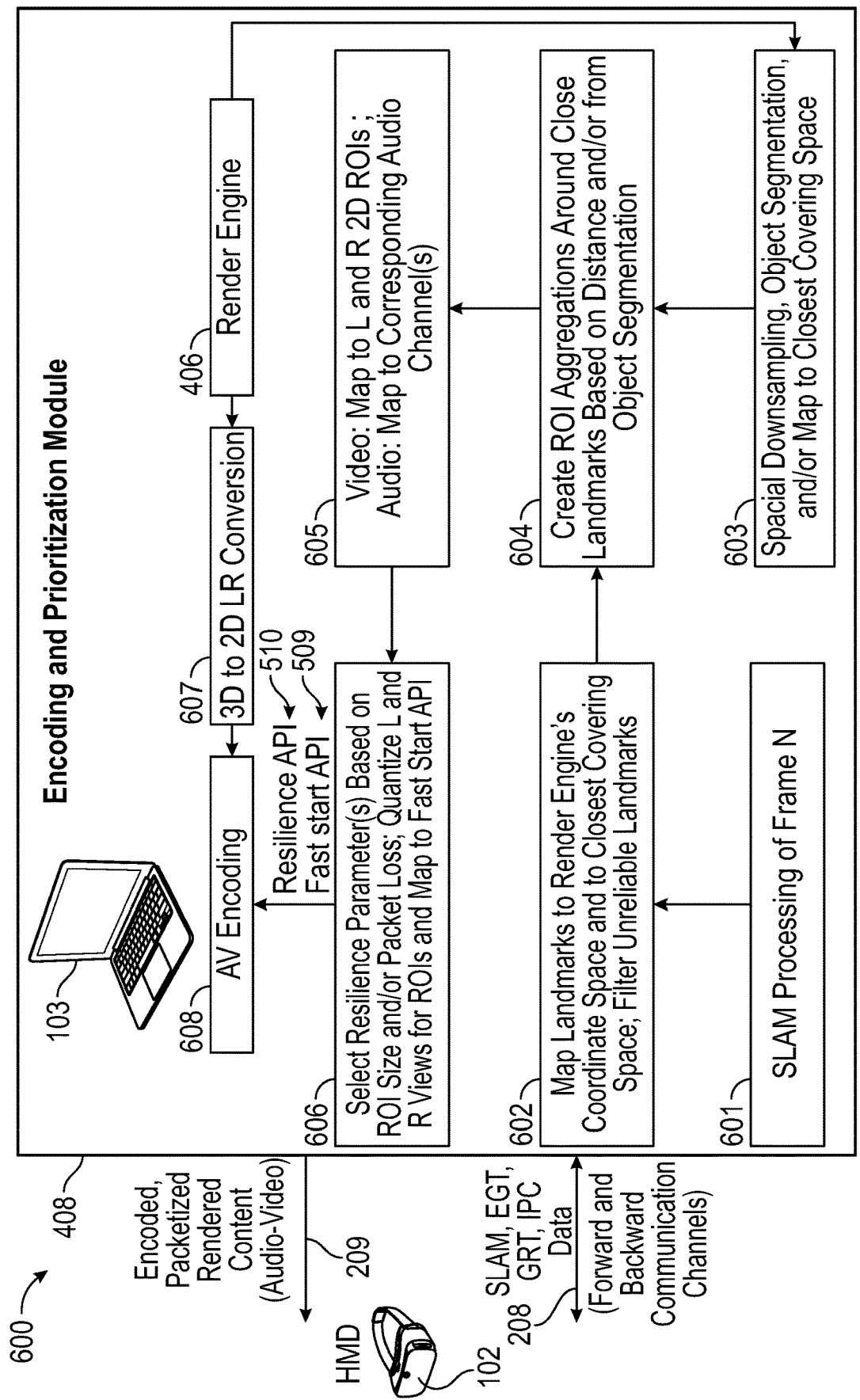
FIG. 6 illustrates an example of a method for using a resilience or fast-start Application Programming Interface (API), according to some embodiments.

FIG. 6 illustrates an example of method 600 for using a resilience and/or a fast-start Application Programming Interface (API). In some embodiments, method 600 may be performed by xR application 401 in cooperation with encoding and prioritization module 408, under execution by IHS 103. As described above, HMD 102 transmits SLAM sensor data, EGT sensor data, EGT data, inter-process (IPC) communication data, etc. to IHS 103 via control interface 208, and IHS 103 transmits encoded packetized rendered content (e.g., audio-video) to HMD 102 via video interface 209.

At block 601, method 600 include the processing of SLAM sensor data (e.g., from an IR/NIR camera), such as a frame N, for example, by SLAM module 403. At block 602, method 600 maps landmarks to render engine 406's coordinate space and/or to a closest covering space. A closest covering space, also known as a minimum or smallest bounding or enclosing box for a point set (S) in N dimensions, is the box with the smallest measure (area, volume, or hypervolume in higher dimensions) within which all the SLAM landmarks lie. Block 602 may also filter unreliable SLAM landmarks by their respective Kalman Gain values.

Meanwhile, render engine 406 produces video frames to be displayed by HMD 102 (in part, using SLAM data), and block 607 performs 3D to 2D L-R conversion of the video frame. Block 608 performs AV encoding of the converted video frames prior to providing packetized, compressed content to HMD 102 via video channel or interface 209.

As render engine 406 provides video frames to block 607, block 603 receives them and performs spatial downsampling and object detection operations. Additionally, or alternatively, block 603 maps detected objects to a closest covering space.

Block 604 creates ROI aggregations around SLAM landmarks based on shortest distance, as well as ROIs from the render engine's object segmentation process. Block 605 maps the aggregated ROIs to L and R 2D ROIs. In some implementations, block 605 may also select one or more audio channels (or 3D audio slices) for aggregation with SLAM landmarks and/or other context information.

In some implementations, block 606 may quantize L and R views for ROIs and maps the views to a fast start API 509 or the like. Additionally, or alternatively, block 606 may receive a calibration LUT as well as packet loss information from the back-channel IPC, and it may select one or more parameters based on the ROI size, and it may send the resilience parameter(s) to encoder 608 using resilience API 510.

A non-limiting example of a video calibration LUT is illustrated in Table I below:

TABLE I

Video Calibration LUT

| Packet Loss (%) | ROI size (in MBs for h.264) | Resilience Parameters |
|---|---|---|
| 0.00% | 1 | Set airRate = 1% |
| 0.00% | 2 | Set airRate = 1% |
| 0.00% | . . . | . . . |
| 0.00% | MAX | Set airRate = 1% |
| 0.01% | 1 | Set airRate = 1.5% |
| 0.01% | 2 | Set airRate = 1.5% |
| 0.01% | . . . | . . . |
| 0.01% | MAX | Set airRate = 1.5% |
| . . . | . . . | . . . |
| . . . | . . . | . . . |
| 2.00% | 1 | Set airRate = MAX % |
| 2.00% | 2 | . . . |
| 2.00% | . . . | . . . |
| 2.00% | MAX | Set airRate = MAX % |

In Table I, the resilience parameter is also known as "airRate," a setting that forces intra macro-blocks (MBs) insertion in P-pictures. In each case, each aggregated ROI may be set with a fixed slice or FMO size. Based on ROI size, an airRate of x % equates to a different number of actual blocks. Generally, the MAX value for airRate is set below 20% to avoid compromising on visual quality and constant bit rate (CBR) control performance.

When encoder 608 receives an airRate value (or a relative airRate value) for a given ROI based on its size and/or based on a current packet loss rate, this is used to refresh all the macro-blocks adaptively. The value may indicate the number of macro-blocks in a frame to be forced as intra macro-blocks (e.g., when encoding 720p @ 30 fps, which has 3600 macroblocks and the airRate is 30, then all macro-blocks are refreshed in 120 frames or four seconds).

To provide audio resilience, calibration may be performed once across all audio channels, layers, or 3D slices, but applicable on a per-channel basis. To illustrate this, a non-limiting example of an audio calibration LUT is shown in Table II below:

TABLE II

| Packet Loss (%) | Resilience Method |
| --- | --- |
| 0.00% | Enable minimal resilience toolset (level 1) |
| 0.01% | Enable minimal resilience toolset (level 2) |
| 0.02% | Enable minimal resilience toolset (level 2) |
| 0.03% | Enable minimal resilience toolset (level 3) |
| . . . | . . . |
| 2.00% | Enable channel redundancy coding on affected audio channel(s) |

In Table II, different audio resilience methods are indicated via an API to encode module 608. In some cases, a priority indication may select one of a plurality of different encoding algorithms or toolsets for audio (e.g., level 1, level 2, . . . ). For higher packet loss measurements, the priority indication may enable channel redundancy coding on the affected audio channel(s).

It should be understood that various operations described herein may be implemented in software executed by logic or processing circuitry, hardware, or a combination thereof. The order in which each operation of a given method is performed may be changed, and various operations may be added, reordered, combined, omitted, modified, etc. It is intended that the invention(s) described herein embrace all such modifications and changes and, accordingly, the above description should be regarded in an illustrative rather than a restrictive sense.

Although the invention(s) is/are described herein with reference to specific embodiments, various modifications and changes can be made without departing from the scope of the present invention(s), as set forth in the claims below. Accordingly, the specification and figures are to be regarded in an illustrative rather than a restrictive sense, and all such modifications are intended to be included within the scope of the present invention(s). Any benefits, advantages, or solutions to problems that are described herein with regard to specific embodiments are not intended to be construed as a critical, required, or essential feature or element of any or all the claims.

Unless stated otherwise, terms such as "first" and "second" are used to arbitrarily distinguish between the elements such terms describe. Thus, these terms are not necessarily intended to indicate temporal or other prioritization of such elements. The terms "coupled" or "operably coupled" are defined as connected, although not necessarily directly, and not necessarily mechanically. The terms "a" and "an" are defined as one or more unless stated otherwise. The terms "comprise" (and any form of comprise, such as "comprises" and "comprising"), "have" (and any form of have, such as "has" and "having"), "include" (and any form of include, such as "includes" and "including") and "contain" (and any form of contain, such as "contains" and "containing") are open-ended linking verbs. As a result, a system, device, or apparatus that "comprises," "has," "includes" or "contains" one or more elements possesses those one or more elements but is not limited to possessing only those one or more elements. Similarly, a method or process that "comprises," "has," "includes" or "contains" one or more operations possesses those one or more operations but is not limited to possessing only those one or more operations.

The invention claimed is:

1. An Information Handling System (IHS), comprising:
a processor; and
a memory coupled to the processor, the memory having program instructions stored thereon that, upon execution by the processor, cause the IHS to:
receive sensor information from a Head-Mounted Device (HMD) worn by a user during execution of a virtual, augmented, or mixed reality (xR) application;
calculate, based on the sensor information, a priority of each of a plurality of Regions-of-Interest (ROIs) within one or more images produced by a rendering engine, each priority based at least in part, on at least one marker placed in a known stationary location; and
indicate the priorities to a video encoder, wherein the video encoder is configured to use each priority to control at least one of: (a) a visual fidelity level, or (b) a resilience level of a corresponding ROI transmitted by the IHS to the HMD in a video signal during execution of the xR application.

2. The IHS of claim 1, wherein the sensor information comprises a plurality of Simultaneous Localization And Mapping (SLAM) landmarks.

3. The IHS of claim 2, wherein a sensor that generates the sensor information comprises an Infra-Red (IR) or Near-IR (NIR) camera mounted on the HMD.

4. The IHS of claim 3, wherein the SLAM landmark data comprises one or more selected SLAM landmarks, among the plurality of SLAM landmarks, with a Kalman Gain above a threshold value.

5. The IHS of claim 4, wherein to calculate the priority of each of the plurality of ROIs, the program instructions, upon execution by the processor, further cause the IHS to select a subset of one or more ROIs closest to the SLAM landmarks.

6. The IHS of claim 4, wherein to indicate the priorities, the program instructions, upon execution by the processor, further cause the IHS to:
map each ROI into a left ROI and a right ROI;
quantize the left and right ROIs; and
provide at least a portion of the quantized left and right ROIs to the video encoder via an Application Programming Interface (API) command.

7. The IHS of claim 6, wherein the API command is executed by the video encoder to allocate more bandwidth to the transmission of the quantized left and right ROIs relative to other portions of the one or more images in the video signal.

8. The IHS of claim 1, wherein the sensor information comprises an Eye-Gaze Tracking (EGT) data that is obtained by a gaze vector captured by an EGT camera mounted on the HMD.

9. The IHS of claim 8, wherein to calculate the priority for each of the plurality of ROIs, the program instructions, upon execution by the processor, further cause the IHS to select a subset of one or more ROIs nearest an object of gaze interaction in the xR application.

10. The IHS of claim 1, wherein each priority comprises an adaptive intra-refresh rate selected based upon at least one of: (i) a size of a corresponding ROI; or (ii) a measure of packet loss.

11. The IHS of claim 1, wherein the program instructions, upon execution by the processor, further cause the IHS to:
calculate, based on the sensor information, a priority of each of a plurality of audio ROIs; and
indicate the priorities to an audio encoder, wherein the audio encoder is configured to use each priority to control at least one of: (a) an audio fidelity level, or (b) a resilience level of a corresponding audio ROI transmitted by the IHS to the HMD in an audio signal during execution of the xR application.

12. A method, comprising:

receiving sensor information from a Head-Mounted Device (HMD) worn by a user during execution of a virtual, augmented, or mixed reality (xR) application;

calculating, based on the sensor information, a priority of each of a plurality of audio Regions-of-Interest (ROIs), each priority based at least in part, on at least one marker placed in a known stationary location; and indicating the priorities to an audio encoder, wherein the audio encoder is configured to use each priority to control at least one of: (a) an audio fidelity level, or (b) a resilience level of a corresponding audio ROI transmitted by the IHS to the HMD in an audio signal during execution of the xR application.

13. The method of claim 12, wherein the sensor information comprises Simultaneous Localization And Mapping (SLAM) landmarks captured by an Infra-Red (IR) or Near-IR (NIR) camera mounted on the HMD.

14. The method of claim 13, wherein calculating the priority further comprises selecting one or more SLAM landmarks, among the SLAM landmark data, with a Kalman Gain above a threshold value.

15. The method of claim 13, further comprising mapping the selected SLAM landmarks to a coordinate space used to reproduce 3D audio and selecting a subset of one or more audio ROIs closest to the SLAM landmarks.

16. The method of claim 12, wherein the sensor information comprises EGT data that is captured by an Eye-Gaze Tracking (EGT) camera mounted on the HMD.

17. The method of claim 16, further comprising selecting a subset of one or more ROIs nearest an object of gaze interaction in the xR application.

18. The method of claim 12, further comprising:

calculating, based on the sensor information, a priority of each of a plurality of ROIs within one or more images produced by a rendering engine; and indicating the priorities to a video encoder, wherein the video encoder is configured to use each priority to control at least one of: (a) a visual fidelity level, or (b) a resilience level of a corresponding ROI transmitted by the IHS to the HMD in a video signal during execution of the xR application.

19. A non-transitory hardware memory of a Head-Mounted Device (HMD) wearable by a user, the non-transitory hardware memory having program instructions stored thereon that, upon execution by a processor, cause the HMD to:

transmit, to an Information Handling System (IHS), frames captured by a Near-Infrared (NIR) camera mounted on the HMD, wherein the frames are used by the IHS to perform Simultaneous Localization and Mapping (SLAM) of the HMD during execution of a virtual, augmented, or mixed reality (xR) application; and receive a video signal encoded by the IHS, at least in part, using at least one marker detected in the frames, the video signal comprising a plurality of Regions-of-Interest (ROIs) each including a priority calculated by the IHS, each priority based at least in part, on the at least one marker, wherein the marker is placed in a known stationary location.

* * * * *